United States Patent [19]

Timmons et al.

[11] 4,217,992
[45] Aug. 19, 1980

[54] DEVICE FOR DISPENSING A MIRROR BUTTON

[75] Inventors: William K. Timmons, Ann Arbor; George A. Koss, Dearborn Heights, both of Mich.

[73] Assignee: Ford Motor Company, Dearborn, Mich.

[21] Appl. No.: 25,150

[22] Filed: Mar. 29, 1979

[51] Int. Cl.³ .............................................. B65G 59/06
[52] U.S. Cl. .............................. 221/113; 221/150 R; 221/278
[58] Field of Search .............. 221/150, 11, 116, 278, 221/264, 290; 156/556, 320

[56] References Cited

U.S. PATENT DOCUMENTS

| 3,408,243 | 10/1968 | Mattimoe | 156/391 |
| 3,712,506 | 1/1973 | Brownbill | 221/11 |
| 3,722,741 | 3/1973 | Mojden | 221/11 |
| 3,938,697 | 2/1976 | Kinney | 221/11 |
| 3,948,719 | 4/1976 | Beckham | 156/556 |
| 4,057,451 | 11/1977 | Beckham | 156/320 |

Primary Examiner—Stanley H. Tollberg
Attorney, Agent, or Firm—William E. Johnson; Keith L. Zerschling

[57] ABSTRACT

This specification teaches a device for dispensing a mirror button from a stack of mirror buttons, and for feeding that mirror button to a predetermined position from which the mirror button can be bonded to a surface of a windshield. A mirror button is the means by which a mirror structure is secured to the windshield. The mirror button is formed of a sintered metallic compound and it has a plastic material thereon which is used to bond the mirror button to the windshield. The device disclosed includes a closed dispenser housing for keeping the mirror button at a constant temperature and humidity. The divice also includes structure for dispensing mirror buttons, one at a time, and structure which brings the dispensed button to a predetermined position at which it can be applied to the windshield.

11 Claims, 11 Drawing Figures

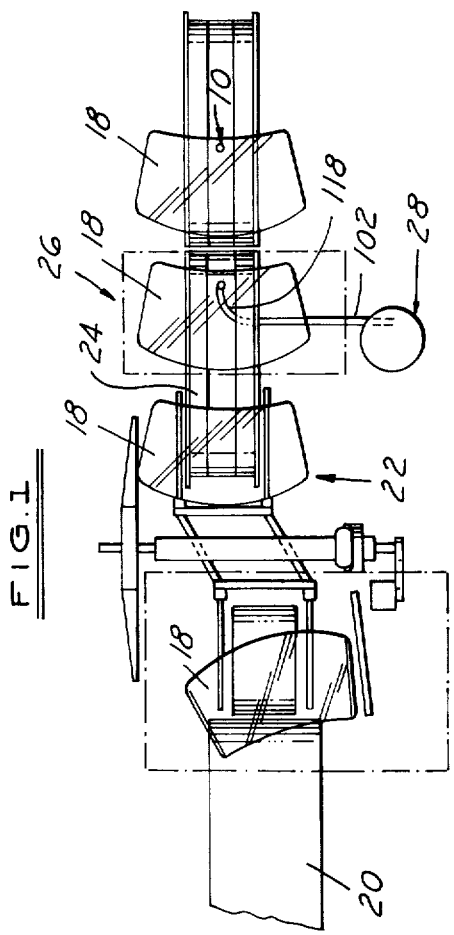
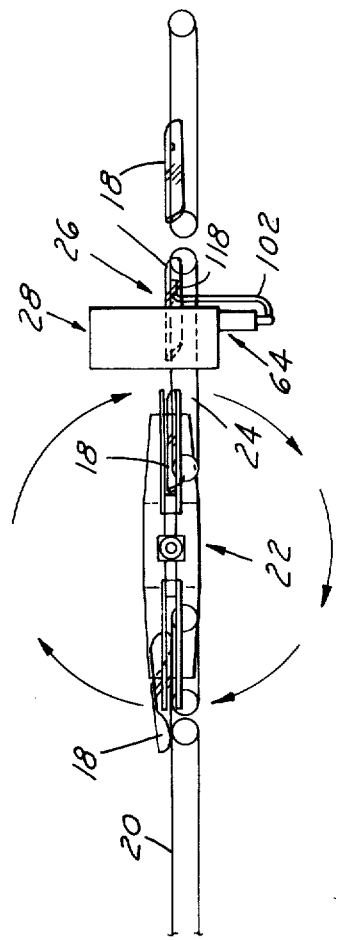

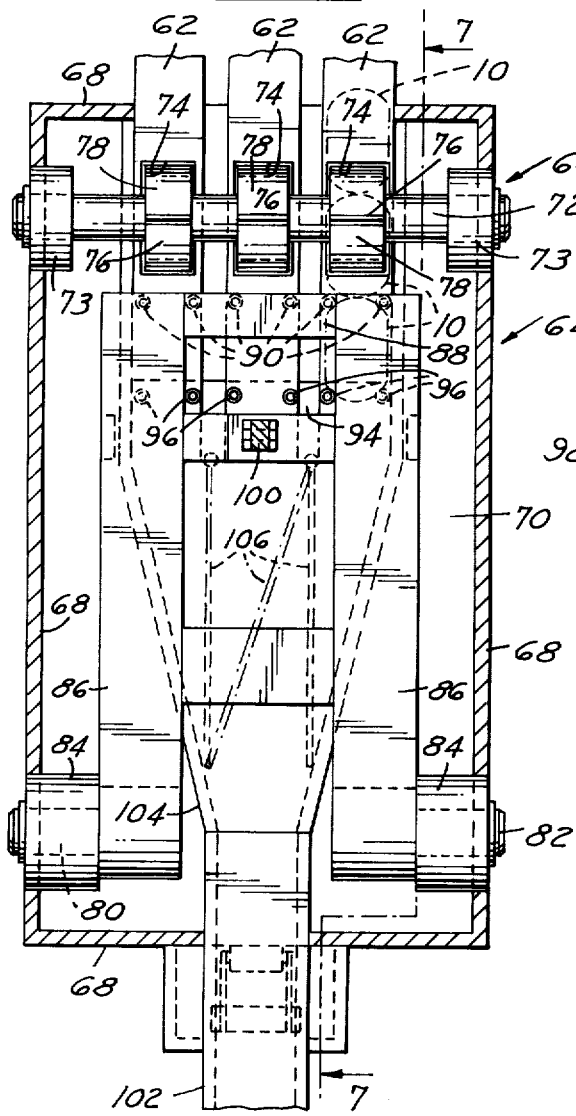
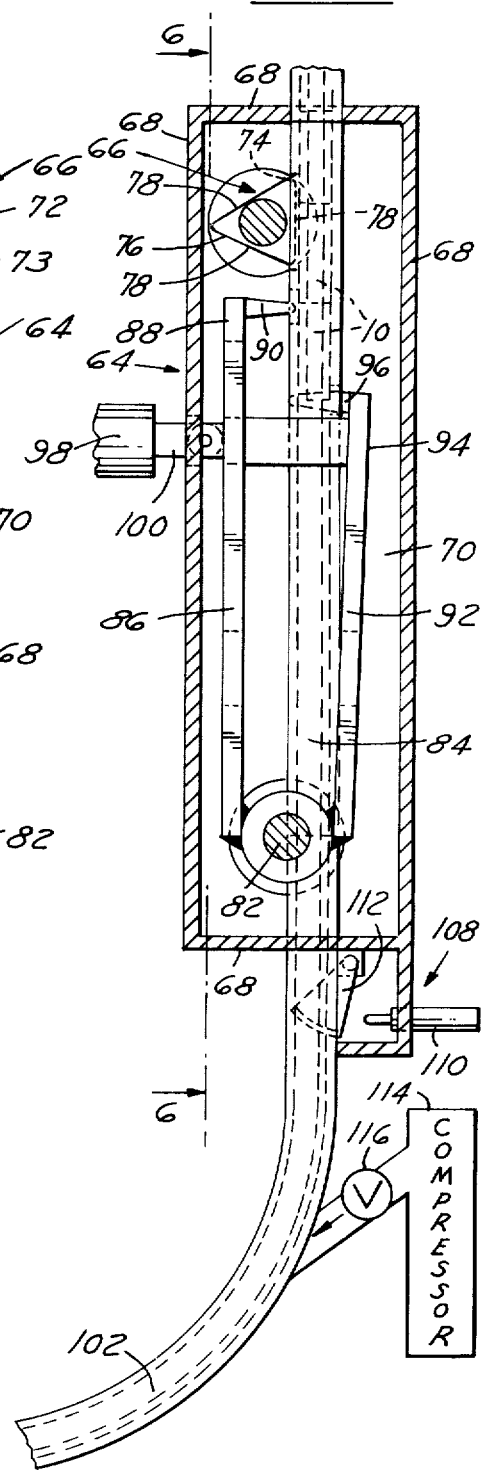

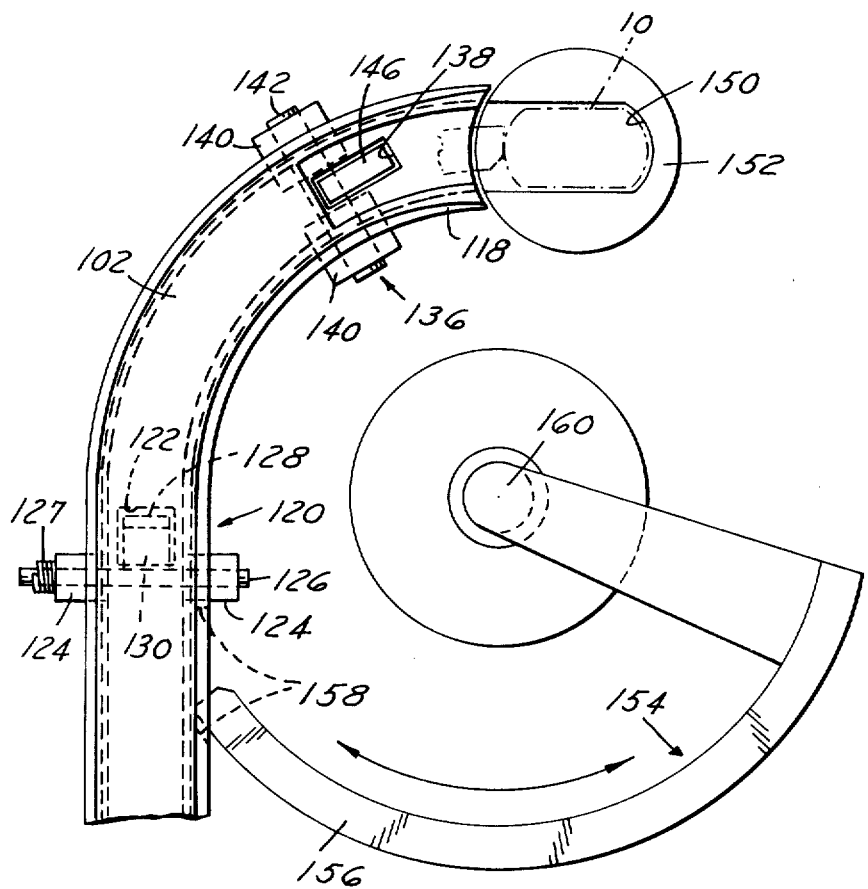
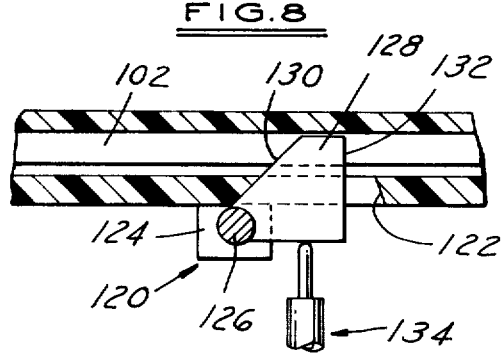

DEVICE FOR DISPENSING A MIRROR BUTTON

In recent years, the automotive industry has developed a system for mounting an automotive mirror to the interior of a windshield by initially bonding a mirror button to the windshield and thereafter securing a mirror structure on the mirror button. In general, the mirror button is formed from a sintered metallic compound. A layer of a plastic material, such as polyvinylbutryl, is used to bond the mirror button to the windshield.

It is a principal object of this invention to provide a device for dispensing such a mirror button from a stack of mirror buttons, and for feeding that mirror button to a predetermined position from which the mirror button can be bonded to a surface of a windshield. In accordance with this principal object, a device is disclosed in this specification which provides for the dispensing of a mirror button from a stack of mirror buttons, and the feeding of that mirror button to a precise location at which that button can be applied to a windshield. The mirror button is fed from a closed dispenser housing in which predetermined temperature and humidity conditions are maintained so that the mirror button and its associated plastic material may be applied successfully to the windshield. It is desirable to maintain the button and its associated plastic material in an atmosphere of predetermined temperature and humidity so that the plastic material, which is hygroscopic, will not absorb excess moisture from the surrounding air, thus resulting in a weak bond to the glass.

In a novelty study conducted on the device disclosed in this specification, the most relevant prior art cited consisted of the following U.S. Pat. Nos. 3,408,243; 3,712,506; 3,722,741; 3,938,697; 3,948,719; and 4,057,541. Each of these patents will be discussed below.

The U.S. Pat. No. 3,408,243 patent shows a system for manual application of a mirror button. The bonding of the button is done by resistance heating and requires several minutes to complete. The operation is completely manual in that the button is placed in a jig and the jig is attached to the windshield. There is no device taught for feeding the mirror buttons.

The U.S. Pat. No. 3,712,506 patent shows magazines for dispensing stacks of nesting articles to an indexing machine. The device disclosed, however, does not deliver the dispensed item to a remote location at which it is accurately positioned for a subsequent bonding operation.

The U.S. Pat. No. 3,722,741 patent discloses a machine for dispensing can ends to a receiving station of a can processing line. Once again, this patent does not show the feeding of a dispensed article to a remote position with an accurate locating of that dispensed article at the remote position.

The U.S. Pat. No. 3,938,697 patent shows a device for dispensing articles from a row of articles. However, the patent does not show a device which controls the moisture content of the articles while in a stacked condition, or structure cooperative with the feeding of an article for positioning that article in an accurate position for subsequent bonding, such as disclosed in this specifiction.

U.S. Pat. Nos. 3,948,719 and 4,057,457 disclose fairly complex systems for positioning and locating a mirror button prior to its application to a windshield which has antenna wires embedded therein. The systems disclosed in these two patents are much more complex than the device disclosed in this specification. Also, the structures for containing and feeding mirror buttons are different from the device disclosed and claimed herein in many other aspects.

SUMMARY OF THE INVENTION

This invention relates to a device for dispensing a mirror button from a stack of mirror buttons, and more particularly, to such a device for dispensing a mirror button and for feeding that mirror button to a predetermined position from which the mirror button can be bonded to a surface of a windshield.

In accordance with the general teachings of this invention, the device for dispensing a mirror button and for feeding that mirror button to a predetermined position includes a closed dispenser housing having a lower base plate with a row of aligned openings therein. Air is supplied to the closed dispenser housing at a controlled temperature and humidity in order to maintain predetermined conditions with respect to temperature and humidity within the closed dispenser housing.

A plurality of magazine sare mounted within the closed dispenser housing. Each of these magazines has a plurality of rows of mirror buttons contained therewithin in a stacked relationship. The number of rows of the mirror buttons in each of the magazines equals the number of openings in the row of aligned openings formed in the lower base plate. The magazines are movable, one at a time, into alignment with the row of aligned openings in the lower base plate so that the stacked mirror buttons may be fed from each aligned magazine into the row of aligned openings in the lower base plate.

Tubes are connected with and extend downwardly from each of the openings of the row of aligned openings formed in the lower base plate. A blocking structure is associated with the tubes for controlling the flow of the rows of stacked mirror buttons from the tubes. The blocking structure controls the flow of the mirror buttons in a manner such that only one row at a time of a plurality of rows of mirror buttons is allowed to move past the blocking structure.

A dispensing structure is associated with each of the tubes. This dispensing structure is located below the blocking structure and is active in dispensing the mirror buttons, one at a time, from a row of mirror buttons. The dispensed mirror button comes from a row of mirror buttons which the blocking structure is permitting to flow from the tubes.

A guide structure is connected to the dispensing structure. The guide structure is provided for carrying a dispensed button along a predetermined path. A propelling structure is associated with the guide structure at a location adjacent the dispensing structure. This propelling structure supplies a propellant force, when required, to cause movement of a dispensed mirror button along the guide structure.

A first decelerating and stop structure is positioned along the predetermined path of the guide structure for slowing down a propelled mirror button near the end of the guide structure. This first decelerating and stop structure also prevents the return of a mirror button that has moved therepast to a position behind the first decelerating and stop structure after that mirror button has passed thereby.

In a similar manner, a second decelerating and stop structure is positioned along the predetermined path of the guide structure between the first decelerating and stop structure and the end of the guide structure. This second decelerating and stop structure is provided for decelerating the mirror button and stopping that mirror button in a position between the first and the second decelerating and stop structures.

A placement and position structure is also provided for movement into and along a final portion of the predetermined path of the guide structure. This placement and position structure enters the guide structure at a first location before the first decelerating and stop structure, and moves along the guide structure to a second location after the second decelerating and stop structure. This second location is a position that locates the mirror button in a precise position for application to a windshield.

Structure is provided for responding to the placement of a mirror button between the first and the second decelerating and stop structures. When a mirror button is so placed, this structure actuates the movement of the placement and position structure so that that placement and position structure enters the guide structure and moves the located mirror button to the second position in which the mirror button may be applied to a windshield.

The preferred structure of the device of this invention is disclosed in detail in a subsequent portion of this specification. It is an object of this invention to provide such a dispensing and locating device which is simple in operation, but yet may be used efficiently and effectively in the application of a mirror button to a surface of a windshield.

BRIEF DESCRIPTION OF THE DRAWINGS

The novel features that are considered characteristic of the invention are set forth with particularity in the appended claims. The invention, itself, however, both as to its organization and its method of operation, together with additional objects and advantages thereof, will best be understood from the following description of specific embodiments when read in conjunction with the accompanying drawings, wherein like reference characters indicate like parts throughout the several figures, and in which:

FIG. 1 is a plan view schematically showing an operation in which a finished windshield is delivered to and located in a station at which a mirror button can be applied thereto.

FIG. 2 is a side elevational view schematically showing the same processing equipment as is shown in FIG. 1.

FIG. 6 is a front elevation view, partly in cross-section, of connecting tubes, blocking structure, and dispensing structure of the device of this disclosure.

FIG. 7 is a side elevation view of the structure shown in FIG. 6 taken along line 7—7 of FIG. 6, and further including guide structure and propelling structure associated with the guide structure in accordance with a preferred embodiment of the device of this disclosure.

FIG. 8 is a side elevation view, in cross-section, of a first decelerating and stop structure of a preferred embodiment of the device of this disclosure.

FIG. 10 is a plan view of a terminal portion of the guide structure which shows the location of the first and second decelerating and stop structures therein in accordance with a preferred embodiment of the device of this disclosure. The Figure also shows the placement and position structure used therewith.

DESCRIPTION OF THE PREFERRED EMBODIMENT

Figure 3:
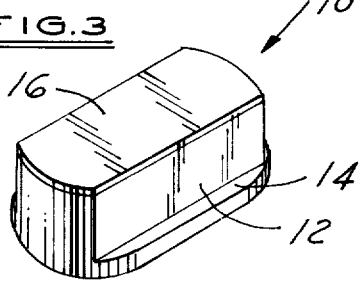
FIG. 3 is a sketch of a mirror button which can be delivered by the device disclosed in this disclosure.

The device disclosed in this specification is for dispensing a mirror button, generally identified by the numeral 10 in FIG. 3, and for delivering that dispensed mirror button to a predetermined position at which it can be applied to a surface of a windshield. The mirror button includes a base portion 12 and a flange portion 14 which are formed from a sintered metallic composition. A polyvinylbutryl layer 16 is bonded to the top of the base portion 12 to provide a means by which the mirror button may be adhesively attached to a windshield. Bonding by such means is well known in the art.

In FIGS. 1 and 2, a plurality of windshields, generally identified by the numeral 18, are shown. These windshields are delivered by a first conveyor 20 to an inverting and positioning apparatus, generally identified by the numeral 22. The apparatus 22 is shown and described in our copending application Ser. No. 021,752 filed Mar. 19, 1979, and entitled "Device for Turning Over and For Transferring a Glass Bracket". No further discussion thereof will be included herein.

The inverting and positioning apparatus 22 delivers a windshield 18 to a second conveyor 24. This second conveyor delivers the windshield 18 to a mirror button bonding station, generally identified by the numeral 26, at which a mirror button 10 is applied to a surface of the windshield which is the interior surface of the windshield. The polyvinylbutryl interlayer 16 of the mirror button is bonded to the interior surface of the glass in a manner known in the art. The flange portion 14 of the mirror button serves as the retaining structure for a mirror assembly, not shown, which is slid onto the mirror button to provide a rearview mirror for the motor vehicle.

The device disclosed in this specification is designed to dispense a single mirror button 10 from a stack of mirror buttons, and thereafter deliver that mirror button to a predetermined position from which associated structure found in the mirror button bonding station 26 can apply the mirror button to the windshield 18.

In accordance with the teachings of a preferred embodiment of the device of this disclosure, a closed dispenser housing, generally designated by the numeral 28, is provided for containing a plurality of mirror buttons 10 therewithin. The closed dispenser housing includes a lower base plate 30, an upper, conical top portion 32, and side members 34 and 36, best seen in FIG. 4. These side members are pivoted at pivot pin 38 so that the respective side members may be pivoted to an open position, a partly open position being shown in dash lines in FIG. 5, thereby to permit mirror buttons to be loaded into the interior of the closed dispenser housing 28.

Figure 4:
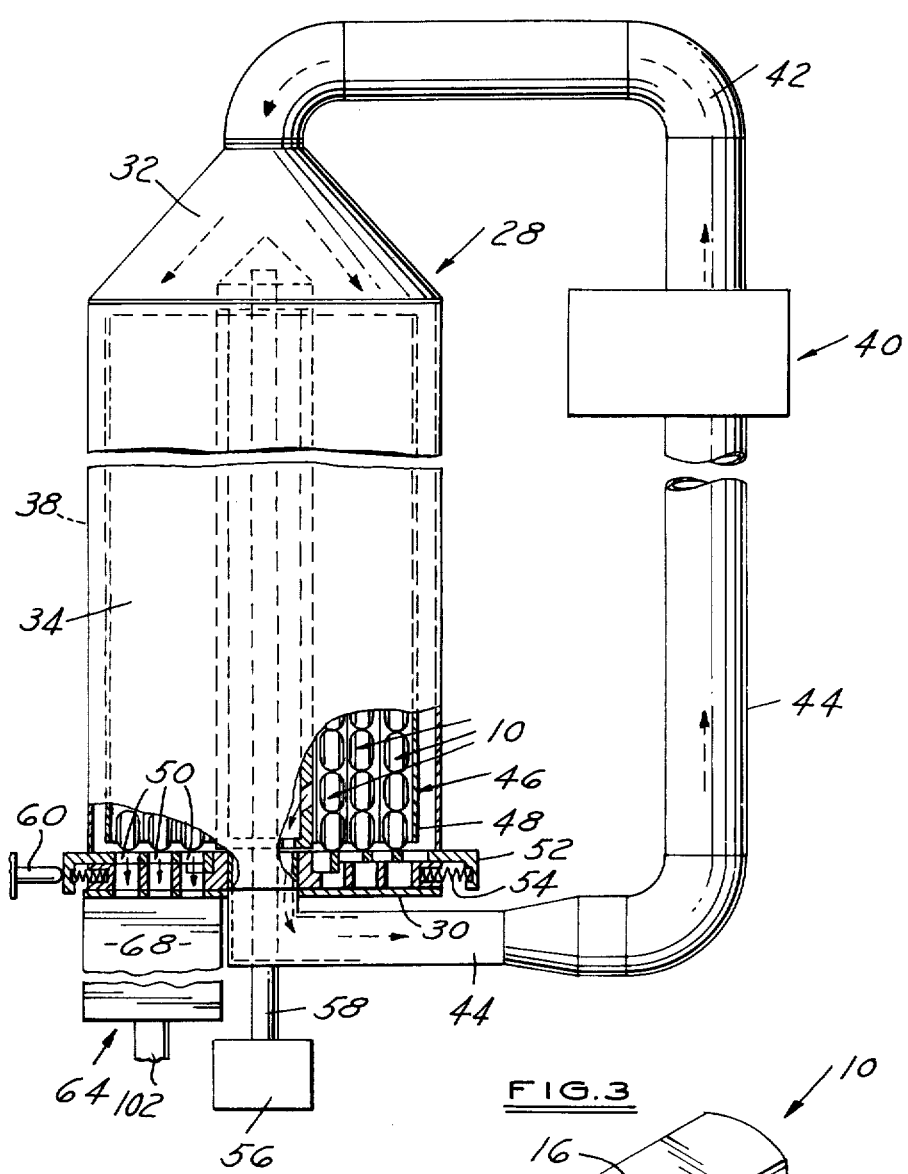
FIG. 4 is a side elevation view, partly in cross-section, of a closed dispenser housing of the device of this disclosure.

An apparatus for supplying air at a particular temperature and humidity, generally designated by the numeral 40, FIG. 4, is connected by an upper tube member 42 to the conical top portion 32 of the closed dispenser housing 28 and by a lower tube member 44 to the lower base plate 30 of the closed dispenser housing, whereby air of a controlled temperature and humidity can be constantly recirculated through the closed dispenser housing. The purpose of recirculating air of constant temperature and humidity is to provide constant conditions for the PVB interlayer 16 attached to the mirror button 10 so that it can be bonded to the windshield in a subsequent operation.

Figure 5:
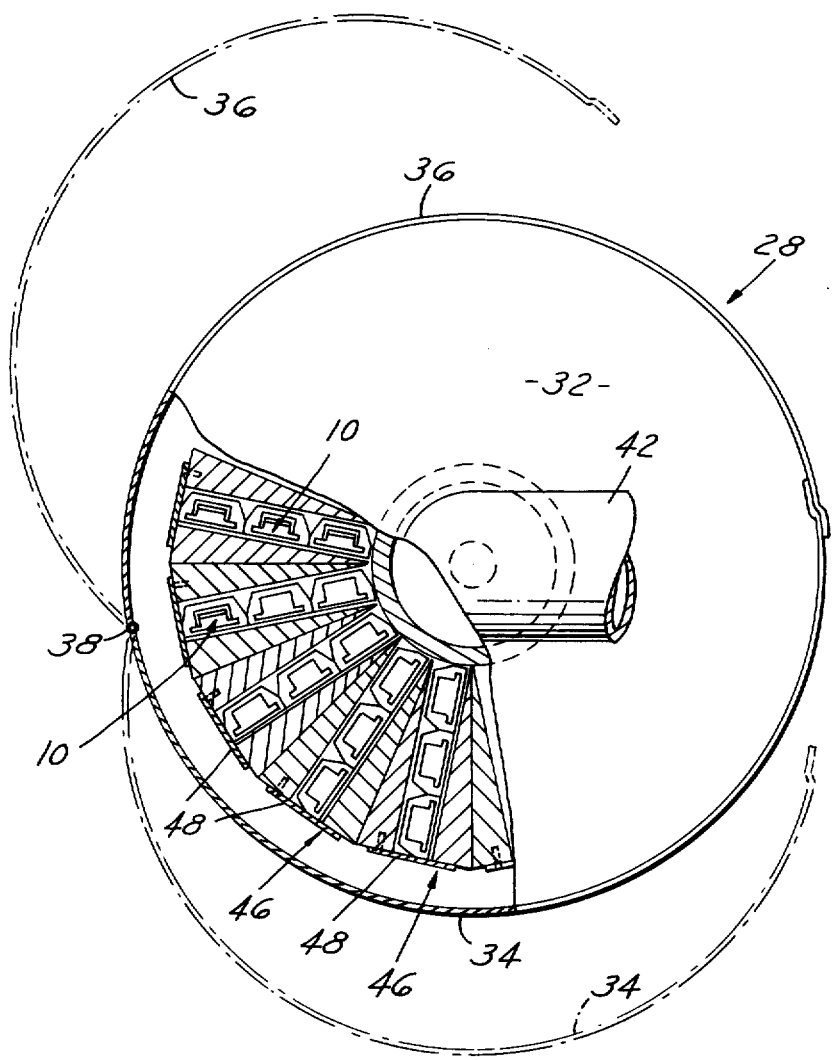
FIG. 5 is a plan view, partly in cross-section, of the dispenser housing of FIG. 4.

As best understood by viewing FIGS. 4 and 5, a plurality of magazines, generally identified by the numeral 46, are housed within the closed dispenser housing 28. In accordance with the teachings of the preferred embodiment, the closed dispenser housing is circular in cross-section. As best seen in FIG. 5, each magazine has a clamping member 48 associated therewith for clamping the magazine in place. In order to load an individual magazine, the clamping member 48 is undone and three rows of mirror buttons 10 are loaded therewithin. The mirror buttons are stacked in a one-above-the-other relationship.

In accordance with a preferred embodiment of the device of this disclosure, there are three rows of mirror buttons 10 in each of the magazines 46. The three rows of mirror buttons are alignable with a row of three openings 50—50 in lower base plate 30, as shown only at the left lower portion of FIG. 4. Each of the magazines 46 has associated therewith a closure member 52, seen only on the lower right portion of FIG. 4. This closure member is biased by means of a small spring 54 to a position which closes off the three rows of buttons from flowing out of the associated magazine. A particular magazine is indexed by means of a motor 56 operating through a shaft 58 to position an individual magazine so that the three rows of mirror buttons held therewithin are aligned with the openings 50—50 in the lower base plate 30. At that time, a plunger device 60 is operated to push the closure member 52 against the small spring 54 to align openings (not shown) in that closure member with the three rows of mirror buttons to allow those buttons to move therepast into tube 62—62, best seen in FIG. 6.

The tubes 62—62 are connected with and extend downwardly from each of the openings 50—50 in the lower base plate 30. As viewed in FIG. 4, the tubes 62—62 are located within a dispensing structure, generally designated by the numeral 64. Operation of this dispensing structure will best be understood by reference to FIGS. 6 and 7.

A blocking structure, generally designated by the numeral 66, in the upper portion of FIGS. 6 and 7, is also associated with the dispensing structure 64 for the purpose of blocking off the tubes 62—62 in such a manner that a single column of mirror buttons 10—10 is fed, one at a time, from a magazine 46. The dispensing structure 64 includes a closed housing 68. The closed housing 68 is formed by a plurality of wall members, all designated by the numeral 68. The closed housing 68 defines an interior volume 70 which is also kept at a relative constant temperature and humidity by flow of air through the openings 50—50 in the lower base plate 30 of the closed dispenser housing 28.

In accordance with the teachings of a preferred embodiment of the apparatus of this invention, the blocking structure 66 includes a central shaft 72 mounted at opposite ends in bearing members 73—73 which are, in turn, mounted on the walls of the closed housing 68. The shaft 72 is indexed by a small motor connected thereto which is not shown.

As best seen in FIG. 6, the shaft 72 extends across the interior volume 70 of the closed housing 68 at a location across the lower portion of each of the tubes 62—62. These tubes have openings 74—74 therein, FIG. 6. A plurality of cams 76—76 are mounted on the central shaft 72 in a location adjacent the openings 74—74 in each of the tubes 62—62. In accordance with the teachings of the preferred embodiment, each of the cams 76 have a flat surface 78 thereon, spaced 120° of arc from the flat surface on an adjacent cam. As the central shaft 72 is indexed through an angular displacement of 120°, a flat surface 78 of one of the cams 76 will be aligned with the opening 74 of an associated tube 62 and will be parallel to the flow of mirror buttons 10 in one of the tubes. This action thus removes a restriction of the cam from the interior of that associated tube to thereby permit the mirror buttons in that tube 62 to flow therepast.

A radius surface on the other two cams 76—76 will be located within the openings 74—74 of their associated tubes 62—62 to prevent movement of the mirror buttons 10 in those tubes therepast. When a first row of mirror buttons has moved past an associated cam, the shaft 62 is indexed through an arc of 120° so as to permit the flow of buttons from another tube 62, while restricting the empty tube which has previously fed mirror buttons therefrom. Thus, the blocking structure 66 is effective to feed one row at a time of mirror buttons from the three rows of mirror buttons being delivered from the magazine 46 which is aligned with the openings 50—50 in the lower base plate 30 of the closed dispenser housing 28.

The dispensing structure 64 includes split shaft members 80 and 82 respectively mounted on the walls of the closed housing 68 near the bottom portion thereof by journal members 84—84. A first mounting bar 86, having a pair of legs respectively connected to shaft members 80 and 82, has a first mounting portion 88 located thereon. This mounting portion contains first blocking fingers 90 thereon with pairs of the blocking fingers being associated with the ends of each of the tubes 62—62.

A second mounting bar 92, shorter than the first mounting bar 86, also has a pair of depending legs, only one shown in FIG. 7, secured respectively to shaft members 80 and 82. The respective leg portions support a second mounting portion 94 which carries thereon second blocking fingers 96—96. These second blocking fingers are associated in pairs with each end of the tubes 62—62 at a distance sufficiently below the first blocking fingers 90—90 that a single mirror button 10 may be contained therebetween.

The first mounting bar 86 and the second mounting bar 92 are spaced angularly from one another, as seen best in FIG. 6, at a distance sufficient that only the first blocking fingers 90 or the second blocking fingers 96 can be received fully within the tubes 62—62. The shaft members 80 and 82 provide a means for pivoting the respective mounting bars back and forth so that alternately the first blocking fingers or the second blocking fingers are located within the tubes 62—62.

A plunger device 98 is provided which has a piston 100 movable therewithin. The piston 100 is connected to the first mounting bar 86, as seen best in FIG. 7. Actuation of the plunger device between one of two alternate positions, that is an advanced position or a retracted position, is effective to move either the first blocking fingers 90—90 or the second blocking fingers 96—96 into the path of travel of the mirror buttons 10 in the associated tubes 62—62. Upon advance of the piston 100, the first blocking finger 90 is moved into the tubes, which permits any mirror button having moved past the first blocking fingers to be dispensed because the second blocking fingers 96 have been withdrawn from the tube. In a retracted position of the piston 100, the second blocking fingers 96—96 are located in the tube, thus permitting a mirror button to move down past the first blocking fingers 90—90 and to come in contact with the second blocking fingers 96—96. It is easy to understand that as the fingers are moved back and forth, a single mirror button 10 is dispensed from the tube 62 which the blocking structure 66 is permitting movement of mirror buttons therefrom. It is in such a manner that mirror buttons are dispensed individually from a row of buttons, which row was initially contained in a magazine 46.

Figure 11:
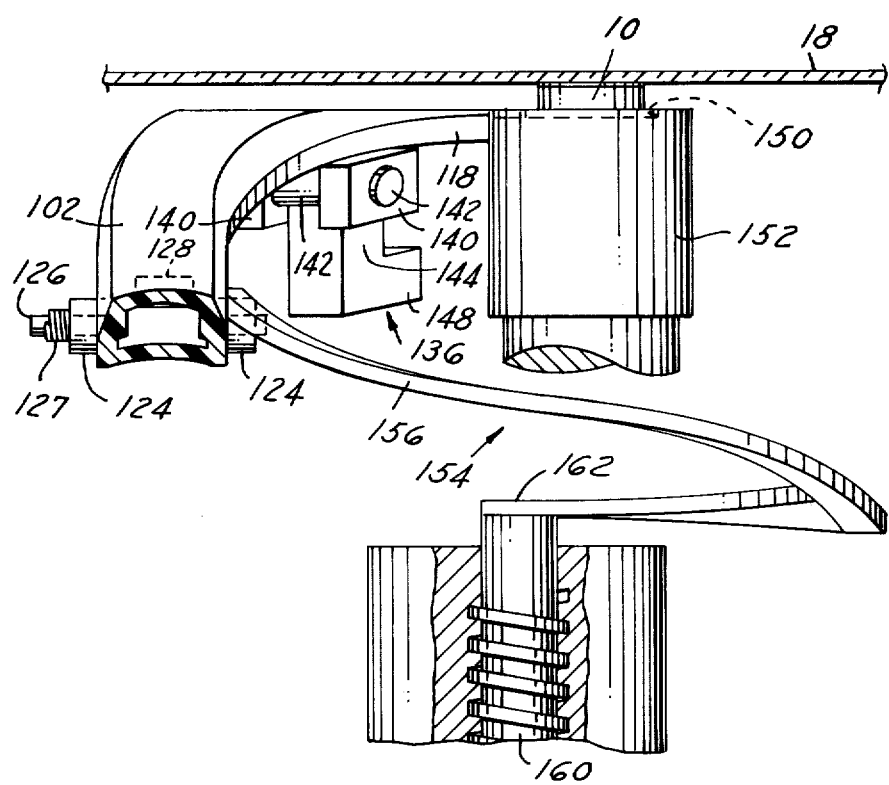
FIG. 11 is a front elevation view, partly in cross-section, of the structure shown in FIG. 10, showing the relative positions of the placement and position structure and its association with both the terminal portion of the guide structure and the first and second decelerating and stop structures of the preferred device of this disclosure.

The dispensing structure 64 terminates in a guide track 102 which generally has a cross-sectional shape the same as the cross-sectional shape of a mirror button, as may best be seen in FIG. 11. An initial portion 104 (FIG. 6, only) of the guide track 102 provides a converging area from each of the three tubes 62—62. A pair of flapper members 106, shown only in dotted position in FIG. 6, are used to aid in directing the dispensed mirror buttons 10 from a tube 62 into the initial portion 104 of the guide track 102. This assists in aligning and guiding the buttons into the guide track.

A propelling device, generally identified by the numeral 108, includes a trip switch 110, see FIG. 7, and a pivotable gate 112. As a mirror button 10 passes the pivotable gate 112, the gate is pushed out of the guide track 102 and comes in contact with the trip switch 110 to cause actuation thereof. The gate, after the mirror button moves therepast, returns to its normal position to seal off the closed housing 68. In a known manner, the trip switch 110 is connected to a source of compressed gas 114, such as compressed air, to actuate the same so that a valve 16 is opened to permit some of the compressed gas to flow into the guide track 102 to cause a propelling of a mirror button therealong. The addition of the compressed gas causes a rapid propelling of the mirror button along the guide track, as will be described hereinbelow, so that the mirror button may be delivered to a position at which it can be placed on a windshield. The structure for delivering the propelled button to a particular location where it can be applied to a windshield is best understood by making reference to FIGS. 8, 9, 10 and 11.

As is best seen in FIGS. 2 and 11, the guide track 102 rises from the dispensing structure 64 to a terminal portion 118 located in the mirror button bonding station 26. The terminal portion of the guide track is best seen in FIGS. 10 and 11. While in the preferred embodiment the track rises near its terminal portion, the track may take any configuration that is desired.

Located between the dispensing structure 64 and the terminal portion 118 of the guide track 102 is a first decelerating and stop structure, generally identified by the numeral 120. This structure is shown in particular detail in FIG. 8. The first decelerating and stop structure includes an opening 122 in the guide track 102 and a mounting structure 124 attached to the bottom of the guide track. A shaft 126 is secured at its opposite ends in the mounting structure 124 for rotative movement therein. A spring 127 (FIGS. 10 and 11) acts between the mounting structure and the shaft 126 in order to bias the shaft to a normal position.

A pivotable member 128 is secured to the shaft 126 in such a manner that when the shaft 126 and associated mounting structure 124 are in their normal position, the pivotable member 128 is located in the center of the guide track 102. The pivotable member 128 has a front surface 130 inclined at an angle with respect to the guide track 102 so that when that front surface is engaged by a propelled mirror button 10, the pivotable member 128 will be pivoted downwardly, as viewed in FIG. 8, to permit movement of the propelled mirror button along the guide track past the first decelerating and stop structure. The pivotable member 128 is pivoted downwardly against the bias of spring 127, the spring serving to return the member to its original position once the mirror button has moved therepast.

A rear face 132 of the pivotable member 128 is located at a right angle with respect to the passage formed by the guide track 102. This rear face 132 is so located so that if a mirror button is rebounded into engagement therewith, the pivotable member 128 will not be moved out of the guide track and thereby will confine the mirror button which engaged the rear face 132 thereof to a position forward of that rear face 132.

As is also seen in FIG. 8, a trip switch, generally identified by the numeral 134, is also associated with the first decelerating and stop structure 120. The function of this trip switch will be explained in greater detail later in this specification.

Figure 9:
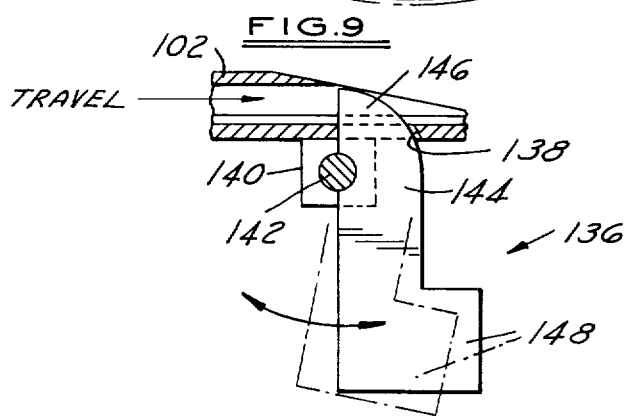
FIG. 9 is a side elevation view, in cross-section, of a preferred embodiment of the second decelerating and stop structure of the device of this disclosure.

At a position between the first decelerating and stop structure 120, and the terminal portion 118 of the guide track 102, there is located a second decelerating and stop structure, generally identified by the numeral 136. The details of the construction of a preferred embodiment of that structure, are best shown in FIG. 9. The second decelerating and stop structure includes an opening 138 in the bottom portion of the guide track 102 and mounting structure 140—140 which support a shaft 142 for rotative movement. The shaft 142, in turn, supports a pivotable member 144 which has a small upper portion 146 thereof extending into the passageway of the guide track 102 so that when a mirror button 10 is propelled into engagement therewith, the mirror button is decelerated and, in some cases, rebounded in the guide track 102. The rebounding of the mirror button may cause movement of the mirror button back into engagement with the rear face 132 of the pivotable member 128 of the first decelerating and stop structure 120.

The pivotable member 144 of the second decelerating and stop structure 136 also has a more extensive and massive portion 148 thereof extending below the guide track 102. This more extensive portion 148 has sufficient mass to offset any forces generated when a mirror button is brought into contact with the small upper portion 146 of the pivotable member 144. The mirror button engaging the pivotable member 144 is decelerated to a condition such that it is not permitted to move past the pivotable member. The mirror button may be rebounded to a position between the first and the second decelerating and stop structures, but the mirror button will be located someplace in the position between these two structures.

Once a mirror button has become located between the first decelerating and stop structure 120 and the second decelerating and stop structure 136, apparatus best shown in FIGS. 10 and 11 is provided for moving that button to a nest 150 on a placement member 152 so that the mirror button 10 may be applied to a windshield 18 for the purposes aforesaid. The action to position the mirror button in the nest 150 is initiated when the mirror button moves past the first decelerating and stop structure 120 by which the trip switch 134 is actuated. Actuation of the trip switch causes operation of a placement and position structure, generally identified by the numeral 154.

The placement and position structure 154 includes a rotatable finger 156. As best seen in FIG. 11, the finger, in its preferred embodiment, is formed so as to have a gradual helical rise which is identical to the helical rise of the guide track 102 between the first decelerating and stop structure 120 and the terminal portion 118 of the guide track. The finger 156 is also dimensioned to be receivable within the opening of the guide track 102. As is best seen in FIG. 10, an opening 158 is provided in the side of the guide track 102 in order to permit movement of the finger therewithin.

When the trip switch 134 of the first decelerating and stop structure 120 is actuated, a motor (not shown) is actuated to rotate a screw climb elevator shaft 160, best seen in FIG. 11. This shaft is attached to the finger 156 at a location 162. As the screw climb elevator shaft is rotated in an upwardly direction, the finger 156 associated therewith is rotated so as to enter the guide track 102 through opening 158 therein, just to the rear of the first decelerating and stop structure 120. The finger moves past the pivotable member 128 of the first decelerating and stop structure 120 to a position between the two stop structures where it engages the mirror button which has become located therebetween. The continued rotation of the screw climb elevator shaft 160 causes movement of the finger 156 along the guide track 102 and results in the upper portion 146 of the pivotable member 144 being pushed out of the track to permit movement of the mirror button and finger 156 therepast.

Rotation of the screw climb elevator shaft 160 is continued until the finger 156 has pushed the button sufficiently far along past the terminal portion 118 of the guide track 102 that the button now rests in the nest 150 of the placement member 152. At that point, the screw climb elevator shaft 160 is rotated in the opposite direction which withdraws the finger 156 from the guide track 102 permitting the movement of a next mirror button into the position between the two decelerating and stop structures. After a mirror button 10 has been placed in the nest 150, the placement member 152 is actuated so as to move the button upwardly into bonding relationship with the surface of the windshield 18.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A device for dispensing a mirror button from a stack of mirror buttons and for feeding that mirror button to a predetermined position from which the mirror button can be bonded to a surface of a windshield, which device comprises:
   a closed dispenser housing including a lower base plate with a row of aligned openings formed therein;
   means for supplying air at a controlled temperature and humidity to said closed dispenser housing;
   a plurality of magazines mounted within said closed dispenser housing, each of said magazines having a plurality of rows of mirror buttons contained therewithin in a stacked relationship, the number of rows of the mirror buttons in each of said magazines equaling the number of said openings in said row of aligned openings formed in said lower base plate;
   means for moving said plurality of magazines one at a time into alignment with said row of aligned openings in said lower base plate;
   tubes connected with and extending downwardly from each of said opening of said row of aligned openings formed in said lower base plate;
   blocking means associated with said tubes for controlling the flow of said rows of stacked mirror buttons from said tubes in a manner that a plurality of rows of mirror buttons from a magazine having its rows aligned with said openings of said row of aligned openings in said lower base plate are allowed to move past said blocking means one row at a time;
   dispensing means associated with each of said tubes and located below said blocking means for dispensing said buttons one at a time from a row of said mirror buttons, the flow of which is being allowed by said blocking means;
   guide means connected to said dispensing means for carrying a dispensed button along a predetermined path;
   propelling means associated with said guide means at a location adjacent said dispensing means, said propelling means for supplying a propellant force to cause movement of a dispensed mirror button along said guide means;
   first decelerating and stop means positioned along the path of said guide means for slowing down a propelled mirror button near the end of said guide means and for preventing the return of that mirror button to a position behind said first decelerating and stop means after that mirror button has passed thereby;
   second decelerating and stop means positioned along the path of said guide means between said first decelerating and stop means and the end of said guide means for decelerating the mirror button and stopping that mirror button in a position between said two decelerating and stop means;
   a placement and position means for movement into and along a final portion of said predetermined path of said guide means from a first location before said first decelerating and stop means to a second location after said second decelerating and stop means which second location is a position that locates the mirror button in a position for application to a windshield; and means for actuating said placement and position means after a mirror button is located between said first and said second decelerating and stop means so that said placement and position means enters said guide means and moves the mirror button past said second decelerating and stop means to a position in which the mirror button may be applied to a windshield.

2. The device of claim 1, wherein: said closed dispenser housing has a circular cross-section.

3. The device of claims 1 or 2, wherein: said lower base plate has a row of three aligned openings therein and wherein each of said magazines has three rows of mirror buttons contained therewithin in a stacked relationship.

4. The device of claims 1 or 2, wherein: said blocking means includes a shaft, means for mounting said shaft in a position such that said shaft extends across said tubes, openings in each of said tubes adjacent said shaft, and cams mounted on said shaft in a location adjacent each of said tubes, said cams having flat surfaces on each one thereof so constructed and arranged that as said shaft is rotated, a flat surface on one of the said cams will be located parallel to the flow of the mirror buttons in one of said tubes to thereby permit said mirror buttons to flow therepast.

5. The device of claims 1 or 2 wherein said dispensing means includes: a housing means for defining an enclosed housing below said closed dispenser housing which encloses said blocking means and said tubes;

a first mounting bar having a first mounting portion thereon extending across the ends of said tubes;

first blocking fingers on said first mounting portion of said first mounting bar, said first blocking fingers being associated with the ends of each of said tubes;

a second mounting bar shorter than said first mounting bar, said second mounting bar having a second mounting portion thereon extending across the ends of said tubes at a position below the point at which said first mounting portion of said first mounting bar extends across the ends of said tubes;

second blocking fingers on said second mounting portion of said second mounting bar, said second blocking fingers being associated with each of said tubes at a position spaced below said first blocking fingers at a distance sufficient so that a single mirror button may be contained therebetween;

means for pivotally mounting said first mounting bar and said second mounting bar on opposite sides of said tubes in a position such that either the first blocking fingers or said second blocking fingers are located within the path of travel of the mirror buttons within said tubes; and means for pivoting said first mounting bar and said second mounting bar back and forth so that the blocking fingers associated with said bar are alternately moved into and out of the path of travel of the mirror buttons in said tubes so that a single mirror button is dispensed one at a time from mirror buttons which are being fed into a particular tube by said blocking means.

6. The device of claims 1 or 2 wherein: said guide means is a track which has a cross-sectional shape equivalent to the cross-section shape of a mirror button being guided therethrough.

7. The device of claims 1 or 2 wherein: said propelling means includes a trip switch actuated by movement of a mirror button thereby and a source of a compressed gas energized momentarily to provide a burst of compressed gas into said guide means when said trip switch is actuated.

8. The device of claims 1 or 2 wherein: said first decelerating and stop means includes a pivotal member having a portion thereof extending into said predetermined path of said guide means, the front face of said member being inclined at an angle so that when engaged by a propelled button said portion of said member extending into said guide means will move out of the guide means to allow the mirror button to move therepast, the member further having a spring actuated trip switch associated therewith for moving said member back into said guide means after the mirror button has moved therepast, the rear surface of the member being generally at a right angle with respect to the direction of movement of the propelled mirror button so that if said mirror button is rebounded into engagement therewith, the member will not be permitted to move therepast in a direction back toward said dispensing means.

9. The device of claims 1 or 2 wherein: said second decelerating and stop means is a member pivotally attached to said guide means and having a small portion thereof extending within said guide means to block the path of travel of a mirror button so that when a mirror button is propelled into engagement therewith, the mirror button is decelerated and, in some cases, rebounded in said guide means, said member further including a more extensive portion extending outside of said guide means sufficient in mass to offset forces generated when a mirror button is brought into contact with a portion of said member extending within said guide means so that the mirror button may be decelerated to a condition not permitting movement therepast.

10. The device of claims 1 or 2 wherein: said placement and position means includes a rotatable finger which (a) moves into said guide means at a position before said first decelerating and stop means, (b) moves past such means along said guide means to engage a mirror button located in said guide means between said two decelerating and stop means, and (c) thereafter pushes said mirror button beyond the said second decelerating and stop means to a location where the mirror button can be applied to a windshield, said rotatable finger being secured to a screw climb elevator shaft which causes said finger to be raised as it moves through said guide means.

11. A device for dispensing a mirror button from a stack of mirror buttons and for feeding that mirror button to a predetermined position from which the mirror button can be bonded to a surface of a windshield, which device comprises:

a closed dispenser housing of circular configuration including a lower base plate with a row of three aligned openings formed therein;

means for supplying air at a controlled temperature and humidity to said closed dispenser housing;

a plurality of magazines mounted within said closed dispenser housing, each of said magazines having three rows of mirror buttons contained therewithin in a stacked relationship;

means for moving said plurality of magazines one at a time into alignment with said row of aligned openings in said lower base plate;

tubes connected with and extending downwardly from each of said row of openings of said row of aligned openings formed in said lower base plate;

blocking means associated with said tubes for controlling the flow of said rows of stacked mirror buttons from said tubes in a manner that a plurality of rows of mirror buttons from a magazine having its rows aligned with said openings of said row of aligned openings in said lower base plate are allowed to move past said blocking means one row at a time, said blocking means including a shaft, means for mounting said shaft in a position such that said shaft extends across said tubes, openings in each of said tubes adjacent said shaft, and cams mounted on said shaft in a location adjacent each of said tubes, said cams having flat surfaces on each one thereof so constructed and arranged that as said shaft is rotated, a flat surface on one of the said cams will be located parallel to the flow of the mirror buttons in one of said tubes to thereby permit said mirror buttons to flow therepast;

dispensing means associated with each of said tubes and located below said blocking means for dispensing said buttons one at a time from a row of said mirror buttons, the flow of which is being allowed by said blocking means;

said dispensing means including:
- a housing means for defining an enclosed housing below said closed dispenser housing which encloses said blocking means and said tubes;
- a first mounting bar having a first mounting portion thereon extending across the ends of said tubes;
- first blocking fingers on said first mounting portion of said first mounting bar, said first blocking fingers being associated with the ends of each of said tubes;
- a second mounting bar shorter than said first mounting bar, said second mounting bar having a second mounting portion thereon extending across the ends of said tubes at a position below the point at which said first mounting portion of said first mounting bar extends across the ends of said tubes;
- second blocking fingers on said second mounting portion of said second mounting bar, said second blocking fingers being associated with each of said tubes at a position spaced below said first blocking fingers at a distance sufficient so that a single mirror button may be contained therebetween;
- means for pivotally mounting said first mounting bar and said second mounting bar on opposite sides of said tubes in a position such that either the first blocking fingers or said second blocking fingers are located within the path of travel of the mirror buttons within said tubes; and
- means for pivoting said first mounting bar and said second mounting bar back and forth so that the blocking fingers associated with said bar are alternately moved into and out of the path of travel of the mirror buttons in said tubes so that a single mirror button is dispensed one at a time from mirror buttons which are being fed into a particular tube by said blocking means;

guide means connected to said dispensing means for carrying a dispensed button along a predetermined path, said guide means being a track which has a cross-sectional shape equivalent to the cross-section shape of a mirror button being guided therethrough;

propelling means associated with said guide means at a location adjacent said dispensing means, said propelling means for supplying a propellant force to cause movement of a dispensed mirror button along said guide means, said propelling means including a trip switch actuated by movement of a mirror button thereby and a source of a compressed gas energized momentarily to provide a burst of compressed gas into said guide means when said trip switch is actuated;

first decelerating and stop means positioned along the path of said guide means for slowing down a propelled mirror button near the end of said guide means and for preventing the return of that mirror button to a position behind said first decelerating and stop means after that mirror button has passed thereby, said first decelerating and stop means including a pivotal member having a portion thereof extending into said predetermined path of said guide means, the front face of said member being inclined at an angle so that when engaged by a propelled button said portion of said member extending into said guide means will move out of the guide means to allow the mirror button to move therepast, the member further having a spring actuated trip switch associated therewith for moving said member back into said guide means after the mirror button has moved therepast, the rear surface of the member being generally at a right angle with respect to the direction of movement of the propelled mirror button so that if said mirror button is rebounded into engagement therewith, the member will not be permitted to move therepast in a direction back toward said dispensing means;

second decelerating and stop means positioned along the path of said guide means between said first decelerating and stop means and the end of said guide means for decelerating the mirror button and stopping that mirror button in a position between said two decelerating and stop means, said second decelerating and stop means including a member pivotally attached to said guide means and having a small portion thereof extending within said guide means to block the path of travel of a mirror button so that when a mirror button is propelled into engagement therewith the mirror button is decelerated and in some cases rebounded in said guide means, said member further including a more extensive portion extending outside of said guide means sufficient in mass to offset forces generated when a mirror button is brought into contact with a portion of said member extending within said guide means so that the mirror button may be decelerated to a condition not permitting movement therepast;

a placement and position means for movement into and along a final portion of said predetermined path of said guide means from a first location before said first decelerating and stop means to a second location after said second decelerating and stop means which second location is a position that locates the mirror button in a position for application to a windshield, said placement and position including a rotatable finger which (a) moves into said guide means at a position before said first decelerating and stop means, (b) moves past such means along said guide means to engage a mirror button located in said guide means between said two decelerating and stop means, and (c) thereafter pushes said mirror button beyond the said second decelerating and stop means to a location where the mirror button can be applied to a windshield, said rotatable finger being secured to a screw climb elevator shaft which causes said finger to be raised as it moves through said guide means; and means for actuating said placement and position means after a mirror button is located between said first and said second decelerating and stop means so that said placement and position means enters said guide means and moves the mirror button past said second decelerating and stop means to a position in which the mirror button may be applied to a windshield.

* * * * *